J. EDGE.
Animal-Trap.
No. 209,388.  Patented Oct. 29, 1878.
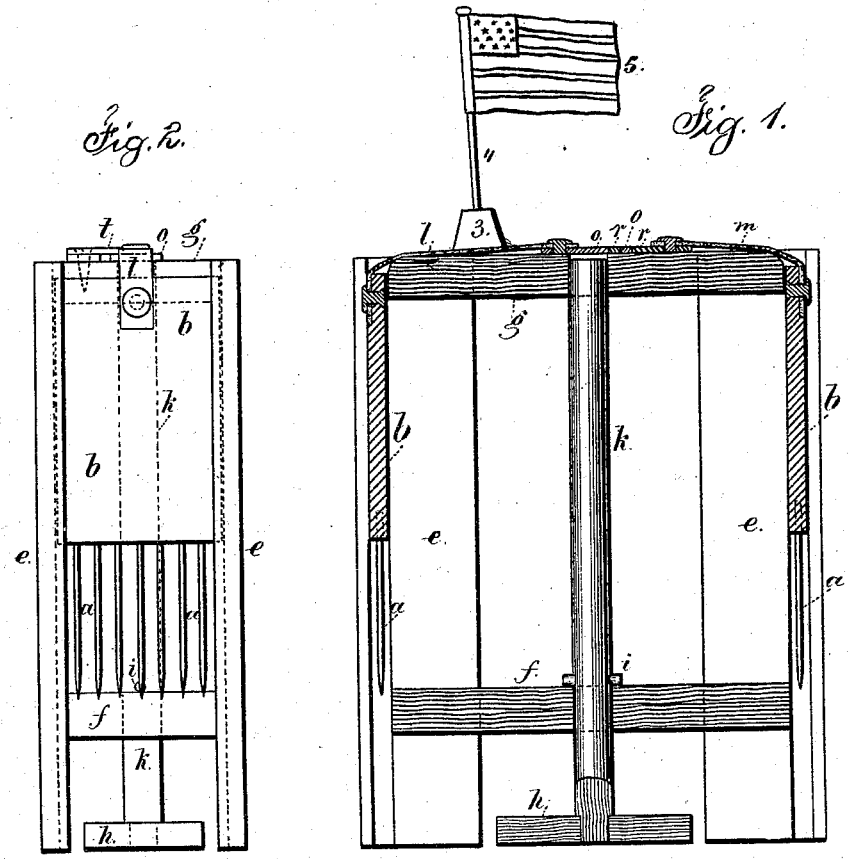
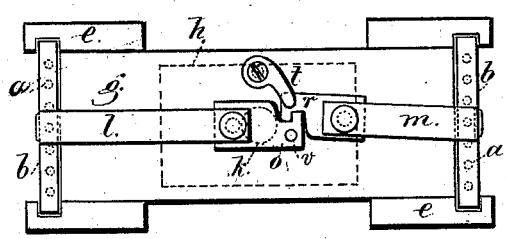

UNITED STATES PATENT OFFICE.

JAMES EDGE, OF PATERSON, NEW JERSEY.

IMPROVEMENT IN ANIMAL-TRAPS.

Specification forming part of Letters Patent No. 209,388, dated October 29, 1878; application filed March 21, 1878.

*To all whom it may concern:*

Be it known that I, JAMES EDGE, of Paterson, in the State of New Jersey, have invented an Improvement in Mole-Traps, of which the following is a specification:

Mole-traps have been made with spikes, operated both by springs and weights, and the trap has been discharged by the ground rising as the mole passes along the hole; and in some instances the weights have been provided with spikes and sustained in slides.

My invention consists in a pair of weights, with spikes projecting from their lower edges, and set to slide freely in vertical slides, and having straps, with hooks for holding up the weights, in combination with a lifter, that disengages the hooks and allows the weights and spikes to fall, thereby piercing the mole, whether at one side of the lifter or the other.

In the drawing, Figure 1 is a vertical section of the mole-trap complete. Fig. 2 is an end elevation, and Fig. 3 is a plan of the same.

The spikes $a$ are in the form of a vertical range along the bottom edge of the weight $b$. It is preferable to place the pointed steel wires in the sand and allow the cast metal to flow around the ends that project into the mold. In this way the spikes or needles are firmly secured into the metal weight, and but little cost is involved in the construction. There are two of these iron weights with the spikes, and there is a frame composed of the vertical slides $e$ $e$ for these weights and the cross-pieces $f$ $g$ that connect them together. This frame may be of wood or metal.

The lifter $h$ is upon a vertical rod, $k$, that slides through the cross-pieces $f$ $g$, and its downward movement is limited by a stop, $i$, above the cross-piece $f$.

Upon the weights $b$ there are straps, $l$ $m$, having hooks $o$ $r$ at the upper end, that are interlocked together when the weights are raised, as seen in Figs. 1 and 2, and these hooks are adjacent to the upper end of the rod $k$. The hook $r$ is passed beneath the finger $t$, so as to keep it from being lifted with the hook $o$ as the rod $k$ lifts said hook $o$, and thereby disconnects the hooks and allows the straps to separate and the weights and spikes to fall.

It is generally preferable to employ a pin, $v$, in the cross-piece $g$ and a hole in the hook $o$, so as to steady the hooks in their proper position relatively to the lifting-rod. The hook $o$ is lifted off this pin $v$ when the trap is set off by the animal, and the faces of the hooks that come into contact should be square or nearly so, in order that they may separate freely as the one is lifted laterally from the other.

To set the trap, it is preferable to tread the earth down flat in the mole-rim and place the trap longitudinally above the same, and raise the weights and let them drop, so that the earth is perforated at the places where the spikes will penetrate. The weights are then raised and the straps hooked together, and the trap is ready. When the trap is set off the spikes re-enter the holes in the earth, and the weight and momentum are expended in forcing the spikes into the mole.

It is desirable to have some indicator, whereby the condition of the trap can be observed from a distance. To provide for this I place a block, 3, upon one of the belts, with a small staff, 4, carrying a piece of red flannel or similar material, 5. This stands upright above the trap when the same is set, but it falls over sidewise when the trap is discharged.

I am aware that mole-traps have been made in which a vertically-sliding weight is provided with a row of spikes at each end, and that catches, cords, and latches have been used to hold up the weight, and these are disconnected by the burrowing of the mole; and I am aware that signals have been used with various traps and fishing-lines.

I claim as my invention—

1. In a mole-trap, the two weights $b$ and spikes $a$, sliding vertically in the frame $e$ and provided with the straps $l$ $m$ and hooks $o$ $r$, in combination with the lifter $h$ and rod $k$, substantially as set forth.

2. The weights $b$ and straps $l$ $m$, in combination with the hooks $o$ $r$, pin $v$, finger $t$, and lifter $h$, substantially as set forth.

3. The combination, in a mole-trap, of the two separate sliding weights $b$, with spikes upon their lower edges, the sustaining-straps $l$ $m$, hooks $o$ $r$, lifter $h$, staff 4, and signal 5, connected to one of the straps, for the purposes and as set forth.

Signed by me this 20th day of March, A. D. 1878.

JAMES EDGE.

Witnesses:
 GEO. T. PINCKNEY,
 WILLIAM G. MOTT.